United States Patent [19]
Schaal

[11] Patent Number: 5,964,002
[45] Date of Patent: Oct. 12, 1999

[54] CLEANING DEVICE FOR WHEELS

[75] Inventor: Valentin Schaal, Otterfing, Germany

[73] Assignee: Schaal GmbH Fordertechnik, Otterfing, Germany

[21] Appl. No.: 08/894,589

[22] PCT Filed: Mar. 11, 1996

[86] PCT No.: PCT/EP96/01035

§ 371 Date: Nov. 10, 1997

§ 102(e) Date: Nov. 10, 1997

[87] PCT Pub. No.: WO96/28324

PCT Pub. Date: Sep. 19, 1996

[30] Foreign Application Priority Data

Mar. 9, 1995 [DE] Germany ............... 295 04 112 U

[51] Int. Cl.$^6$ ............................................. A46B 13/02
[52] U.S. Cl. ......................... 15/21.1; 15/88.2; 15/97.1
[58] Field of Search ........................... 15/21.1, 53.4, 15/88.1, 88.2, 97.1

[56] References Cited

U.S. PATENT DOCUMENTS 4,173,053  11/1979  Wills .
5,098,744  3/1992  Enegren .

FOREIGN PATENT DOCUMENTS

| 0 338 509 A1 | 4/1989 | European Pat. Off. . |
| 23 55 763 | 5/1975 | Germany . |
| 24 26 415 | 12/1975 | Germany . |
| WO 90/11210 | 10/1990 | WIPO . |

*Primary Examiner*—Randall E. Chin
*Attorney, Agent, or Firm*—Burns, Doane, Swecker & Mathis, L.L.P.

[57] ABSTRACT

A cleaning apparatus for wheels which comprises at least one reception means arranged in a cleaning chamber and used for receiving a wheel, said cleaning chamber having arranged therein at least one washing device which is adapted to be associated especially with the rim of a wheel. In order to prevent an operator getting wet or even injuring himself and in order to implement the cleaning apparatus also in such a way that it has a less complicated structural design and reduced power consumption, the reception means in the cleaning chamber is supported such that it is pivotable between a receiving position and a cleaning position and said reception means comprises at least two clamping means which are used for holding the wheel and adapted to be displaced between a release position and a clamping position.

30 Claims, 4 Drawing Sheets

CLEANING DEVICE FOR WHEELS

The present invention refers to an apparatus for cleaning wheels which comprises at least one reception means arranged in a cleaning chamber and used for receiving a wheel, said cleaning chamber having arranged therein at least one washing device which is adapted to be associated especially with the rim of a wheel.

Such a cleaning apparatus is known from WO 90/11210. In this known cleaning apparatus, a wheel is manually introduced in the cleaning chamber, the wheel being preferably vertically oriented. In the interior of the cleaning chamber three rollers are provided as reception means for the wheel, said rollers being arranged essentially in the angles of an equilateral or of an isosceles triangle. The tread of the wheel is placed on two lower, spaced rollers, and a third roller, which is located opposite the two other rollers, is pressed against the tread. The wheel is thus held at three points on the circumference thereof. Normally, one of the rollers is driven so that the wheel is rotated in contact with said three rollers.

In the case of the known prior art, the washing device, which is arranged in the cleaning chamber, is provided with a rotating nozzle on one side of the wheel rim and with a brush which is adapted to be pivoted into contact with the wheel rim on the other side thereof. By means of the nozzles and the brush, the wheel rim is cleaned during a plurality of rotations thereof. When the cleaning process is finished, the pivotable brush is moved away from the wheel, the roller pressed against the tread of the wheel is raised and the wheel is removed from the cleaning chamber.

The known cleaning apparatus is disadvantageous insofar as the wheel is introduced in the cleaning chamber by hand until it has practically reached its washing position and is subsequently removed from this position by hand. It may therefore happen that the operator comes into contact with water and/or respective cleaning agents which are contained in the cleaning chamber. If the wheel is cleaned e.g. by a hot-water or steam-jet device, the operator may additionally come into contact with still hot components of the cleaning chamber and injure himself.

Another disadvantage is that, during the washing process, the wheel as well as the nozzles and brushes, respectively, must be rotated for cleaning the wheel rim. This is comparatively complicated from the structural point of view and the amount of energy consumed is comparatively high.

Hence, it is the object of the present invention to improve a cleaning apparatus of the type mentioned at the beginning in such a way as to prevent an operator getting wet or even injuring himself and also in such a way that the cleaning apparatus has a less complicated structural design and reduced power consumption.

In the case of a cleaning apparatus having the features of the generic clause of claim 1, this object is achieved by the features that the reception means in the cleaning chamber is supported such that it is pivotable between a receiving position and a cleaning position and that said reception means comprises at least two clamping means which are used for holding the wheel and adapted to be displaced between a release position and a clamping position.

Due to the fact that the reception means are pivotable, washing of the wheel takes place at a position which is different from the wheel-receiving position. This has the effect that the operator who inserts the wheel in the reception means when said reception means is at its receiving position can no longer come into contact with the actual washing device. Hence, he will almost certainly not get wet and the risk of injuries caused by hot water or heated parts of the cleaning chamber is practically excluded. Furthermore, it is no longer necessary to support the wheel in a rotatable manner by means of a number of rollers. The wheel is held by the respective clamping means of the reception means and the components rotated are, at most, the components belonging to the washing device, such as rotating nozzles, rotating brushes or the like.

In accordance with a preferred embodiment, two reception means are arranged side by side in the cleaning chamber so that a pair of wheels can always be cleaned at the same time. It is also possible to clean a complete set, i.e. four wheels of a motor vehicle by a corresponding number of reception means in a cleaning chamber at the same time.

For maintaining the vertical orientation of the wheel and for rendering the structural design simple in this way, it will be advantageous to support the reception means on a substantially horizontal axle. The receiving position and the cleaning position of the reception means are arranged on different levels in this way so that e.g. the reception means holding the wheel can pivoted from the higher receiving position downwards to the cleaning position in a simple manner. It is, of course, also possible to arrange the receiving position and the cleaning position the other way round.

In this connection, it will also be advantageous when the reception means are fastened to the horizontal axle such that they are secured against rotation relative thereto and when said horizontal axle is pivotably supported in the cleaning chamber. In this way, it is not necessary to pivot each reception means separately, but all reception means are pivoted simultaneously by roating the horizontal axle.

In accordance with a simple embodiment of the reception means, said reception means includes a crossbar which extends essentially at right angles to the horizontal axle and at the two ends of which the clamping means are displaceably supported. The clamping means are preferably adapted to be brought into engagement with the outer cover of the wheel and they hold said outer cover at their clamping position so that the reception means can then be pivoted between the receiving position and the cleaning position.

A preferred embodiment is characterized in that the clamping means are implemented as clamping arms which project from the crossbar essentially at right angles thereto and which are in contact with substantially opposed sections of a tread of the wheel when they are at their clamping position. The clamping arms are in this way pressed against the tread of the wheel in a simple manner, whereby the wheel is held.

In order to hold the wheel more reliably in the clamped condition, each clamping arm can have at the free end thereof a clamping jaw which is adapted to be brought into engagement with the tread of the wheel. The holding effect is improved still further by the fact that the clamping jaw has a concave contact surface. The curvature of said concave contact surface corresponds essentially to the the curvature of the tread.

For supporting the wheel on the sides and for simplifying the positioning of the wheel relative to the clamping jaws, it will also be advantageous when the clamping jaw is provided with at least two retaining flanges projecting on opposite sides of the contact surface.

For realizing the displaceability of the clamping arms relative to the crossbar in a simple manner, each of the clamping arms is secured to a sliding sleeve which is adapted to be displaced along the crossbar. At the release position of the clamping means, the respective sliding sleeves at the ends of the crossbar are located at a greater distance from one another than at the clamping position. The clamping arm can be fixed to the sliding sleeve by means of welding. It is also possible to fasten the clamping arm releasably with the aid of screws or with the aid of other suitable means.

An angular cross-section of the crossbar will be advantageous for holding the sliding sleeves in a simple manner such that they are secured against rotation relative to the crossbar. Possible cross-sectional shapes are e.g. triangular, square, rectangular, etc.

For moving the sliding sleeves along the crossbar in a simple manner, a piston-cylinder unit can, for example, be associated with each sliding sleeve. When the piston moves relative to the cylinder, the sliding sleeve will be moved relative to the crossbar. The piston-cylinder unit can be actuated pneumatically or hydraulically. It will be advantageous when both sliding sleeves of a crossbar can be moved by one piston-cylinder unit. This can be done e.g. by a double-acting piston-cylinder unit which is connected to both sliding sleeves in a motion-transmitting manner.

In a preferred embodiment, the piston-cylinder unit is arranged essentially at right angles to the crossbar and connected to the sliding sleeves via connection arms. If, in this connection, the piston is pushed further out of the cylinder, i.e. if it moves away from the crossbar at right angles thereto, the sliding sleeves connected to the piston via the connection arms will be moved towards the middle of the crossbar. The reverse motion takes place analogously.

It will prove to be advantageous when the piston-cylinder units of the respective reception means are adapted to be operated simultaneously so that, when there is a pair of wheels or when there are e.g. four wheels, all the wheels can be held by the clamping means simultaneously.

In accordance with one embodiment of the present invention, the washing device is adapted to be associated with the rim of a wheel held by the reception means at the cleaning position. The washing device can include at least one stationary brush which is rotatably supported on a sidewall of the cleaning chamber so that said washing device can be associated more easily with the wheel rim. In this case, the stationary brush used for cleaning one side of the wheel rim need not be supported in a special manner such that it can be pivoted or displaced. The stationary brush is arranged such that it is in contact with one side of the wheel rim when the reception means is at is cleaning position. For cleaning both side s of the wheel rim, the washing device includes a rotatably supported counterbrush that is located opposite said stationary brush.

Instead of the stationary brush or the counterbrush or in addition to these brushes, washing nozzles or spray nozzles can additionally be arranged, which support the cleaning process in combination with said brushes. The respective nozzles may also be integrated in the brushes. Furthermore, other brushes or nozzles can clean the outer cover of the wheel simultaneously with the rim-cleaning operation. The washing device can be provided with suitable means for adding a cleaning agent in proper doses.

For simplifying the pivotal movement of the reception means holding the wheel to and away from the cleaning position, it will in this connection also be advantageous when the counterbrush is supported such that it is adapted to be displaced in the direction of its rotating axle. Before the reception means is pivoted to the cleaning position, the counterbrush is arranged at a larger distance from the stationary brush so that between these brushes a free space is defined which is sufficiently large for accommodating a wheel. When the reception means are then at the cleaning position, the counterbrush is moved towards the stationary brush and associated with the respective wheel rim so as to clean said wheel rim.

For supporting the counterbrush in a simple manner, the associated rotating axle can be supported on the upper end of a brush carrier which is arranged substantially centrally between two reception means. In this connection, it will also be advantageous when respective counterbrushes are displaceably arranged on both ends of the rotating axle. This will have the effect that a pair of wheels can simultaneously be cleaned more easily and more simply.

For providing the counterbrush with a simple structural design and for guaranteeing simultaneously that the counterbrush and the rotating axle rotate together, each counterbrush is arranged on a displacement cap which is connected to the rotating axle in a motion-transmitting manner. The motion-transmitting connection can be effected e.g. via teeth provided between the displacement cap and the rotating axle.

Analogously to the sliding sleeves provided in the case of the reception means, a piston-cylinder unit connected to both displacement caps in a motion-transmitting manner can be arranged at the upper end of the brush carrier. This piston-cylinder unit can be implemented as a double-acting unit or it can, again analogously to the reception means, be implemented as an individual piston-cylinder unit provided with connection arms that are arranged between said piston-cylinder unit and the respective displacement cap.

In accordance with a simple mebodiment, a connection arm end which is associated with the displacement cap is articulated on a slip ring, which is rotatably supported on the displacement cap such that it is substantially non-displaceable in the axial direction, so that the displacement cap can be rotated relative to the connection arm in a simple manner.

For permitting the wheel to be removed from the cleaning chamber after the washing process, the reception means can, for example, be pivoted from its cleaning position back into the receiving position where the wheel can be removed by an operator. In accordance with a simple embodiment, a discharge ramp is arranged in the cleaning chamber below the reception means, when said reception means is located at its cleaning position. When the washing process has been finished, the clamping means can therefore be moved to the release position while the reception means occupies its cleaning position, whereby the wheel will be released and can then automatically roll out of the cleaning chamber along the discharge ramp.

In the case of the cleaning apparatus which is known in practice and which has been mentioned at the beginning, the cleaning chamber is surrounded by a housing having at least one insertion opening used for inserting a wheel and associated with the reception means. Such a housing can also be provided in the case of the cleaning apparatus according to the present invention. In this connection, it will also be advantageous when the housing is provided with at least one discharge opening that is associated with a discharge end of the discharge ramp. When the wheel has been released while the reception means occupies its cleaning position, it can automatically roll out through said discharge opening and be taken hold of by an operator outside of the housing.

In this connection, the insertion opening and the discharge opening are preferably arranged in a front wall of the housing one on top of the other. The whole cleaning apparatus is provided with a comparatively compact structural design in this way, the insertion openings being arranged above the discharge openings and the reception means being pivoted from a receiving position that is associated with the insertion opening downwards to the cleaning position. When the washing process has been finished, the wheel is released and can drop e.g. on the discharge ramp and roll along said discharge ramp to the discharge opening, with or without the aid of the reception means returning to the receiving position, and leave the cleaning apparatus through said discharge opening.

Wheel guide means can be arranged on at least one side of the insertion opening and/or the discharge opening in the interior of the housing so as to support the wheel when it is being inserted or when it rolls out of the cleaning apparatus. When a wheel is, for example, inserted through the insertion opening, these wheel guide means help to associate it precisely with the reception means provided with the respective clamping means.

For facilitating insertion of the wheel and for permitting the wheel to roll out more easily, the wheel guide means can be implemented as at least one guide roller which is rotatably supported on a sidewall of the housing.

For permitting a wheel-guiding effect also when the reception means is being pivoted between the receiving position and the cleaning position, the wheel guide means can comprise e.g. two guide rollers which are rotatably supported on the respective sidewall, the axes of rotation of said guide rollers extending at an acute angle and being directed essentially towards the rotating axle of the reception means. When the reception means is being pivoted from the receiving position to the cleaning position, the outer cover of the retained wheel is moved in rolling contact with the guide rollers, whereby an additional lateral guiding effect is produced.

The cleaning apparatus according to the present invention can, for example, also comprise air nozzles which dry the clean wheel when the washing process has been finished. Furthermore, after having been cleaned in a suitable manner, the used waste water can be reused making use of an appropriate water cycle including a return pump.

For controlling the cleaning apparatus, a suitable electronic control means is provided, which can be actuated e.g. via suitable push-button keys, switches or the like on the outer surface of the housing. The buttons and switches can then be used for selecting various programs for cleaning a dirty wheel. Furthermore, associated signalling means, such as lamps, can be provided so as to monitor and display the sequence of the steps of the cleaning process.

In the following, one embodiment of the present invention will be explained and described in detail on the basis of the figures added in the drawing, in which.

Figure 1:
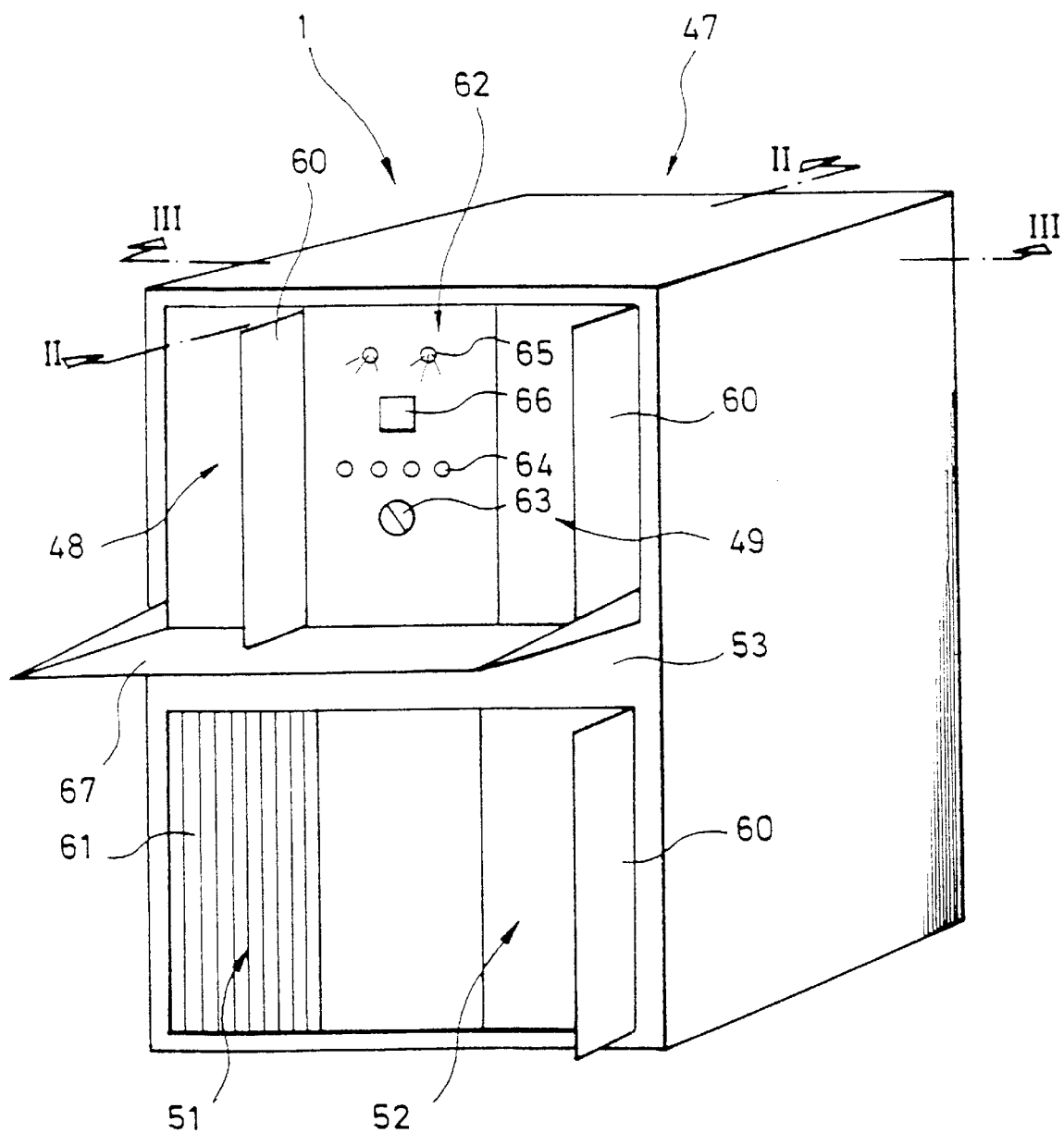
FIG. 1 shows a perspective view of an embodiment of the cleaning apparatus according to the present invention.

The cleaning apparatus 1 according to the present invention comprises a substantially cuboid housing 47 according to FIG. 1. The front wall 53 of said housing 47 has formed therein two insertion openings 48 and 49 and two discharge openings 51 and 52. The respective openings are arranged in spaced relationship with one another adjacent to sidewalls of the housing and they are substantially rectangular.

The insertion openings 48 and 49 are arranged in an upper half and the discharge openings 51 and 52 in a lower half of the front wall 53. The openings can be closed by swinging doors 60 which can be spring-loaded in the direction of their closed position.

The swinging doors can also be replaced by a curtain of strips 61 which is shown at the discharge opening 51 and which consists of a plurality of parallel, essentially vertical strips of plastic material.

Between the insertion openings 48 and 49, a control panel 62 is provided, the control means for the cleaning apparatus being arranged behind said control panel. The control panel comprises a program switch 63, a number of key buttons 64, two indicator lamps 65 and a measuring instrument 66. The arrangement and the selection of the various buttons and lamps and of the measuring instrument are only shown by way of example.

Figure 2:
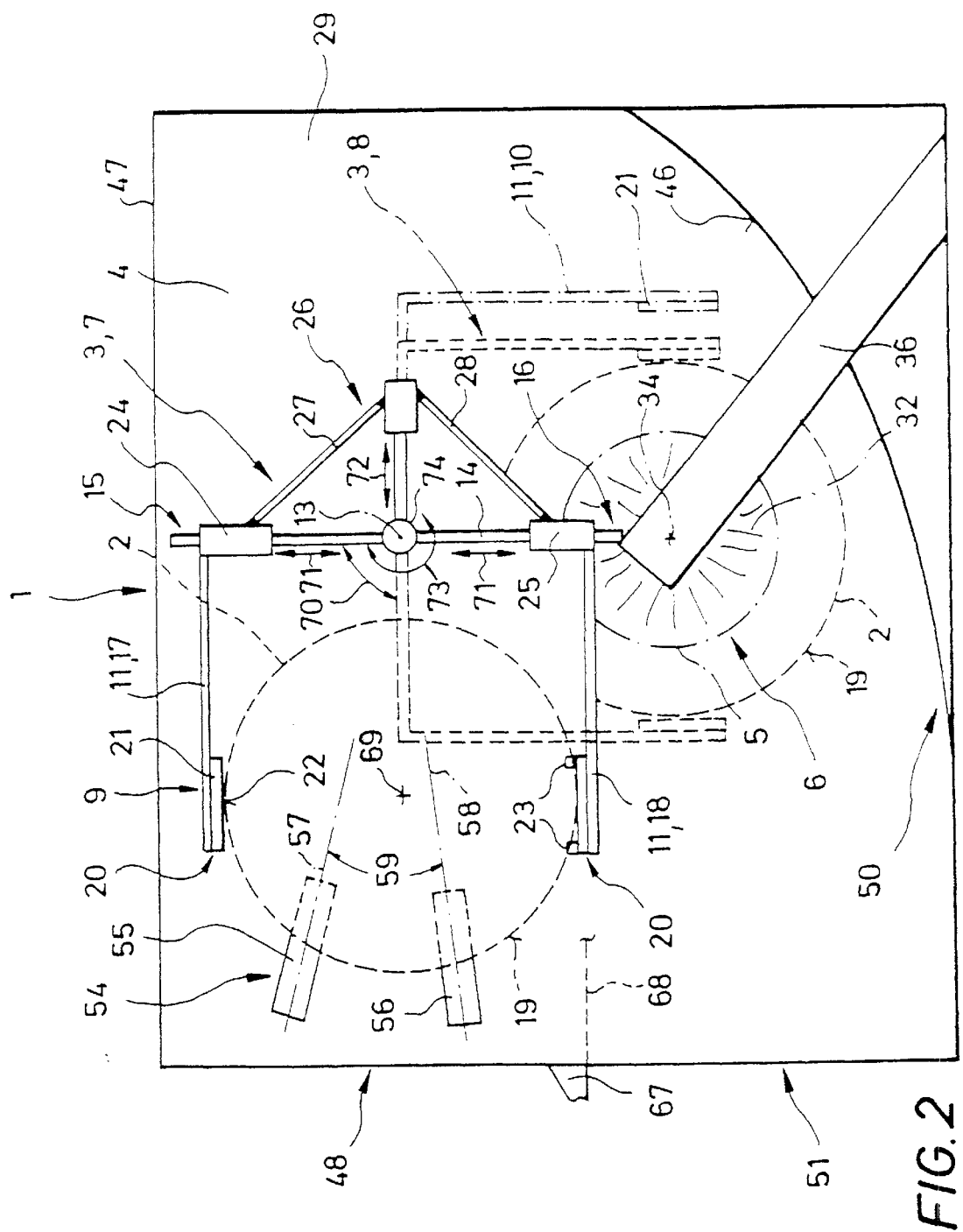
FIG. 2 shows a section along line II—II of FIG. 1.

FIG. 2 shows a section along line II—II of FIG. 1, the means in the interior of the housing 47 behind the insertion opening 48 and the discharge opening 51 being shown in said FIG. 2.

A roll-on ramp 68 can extend from the loading plate 67, which projects from the front wall 53 of the housing 47 to the front, up to a point in the vicinity of a reception means 3. This reception means 3 is shown at its receiving position 7 by a solid line and at its cleaning position 8 by a broken line.

At its receiving position 7, the reception means 3 is arranged such that its two clamping means 11, which are implemented as clamping arms 17 and 18, are directed towards the insertion opening 48 for receiving a wheel 2. The clamping arms are provided with clamping jaws 21 which are arranged at the free ends 20 thereof and which abut on a tread 19 of the wheel 2 in opposed relationship with one another, whereby the wheel 2 will be fixed at the clamping position 9 of the clamping arms 17 and 18. The clamping jaws 21 have a contact surface 22 which can have a concave curvature corresponding to the curvature of the tread 19 of the wheel 2. In addition, two retaining flanges 23 can be arranged on opposite sides of each contact surface 22, said retaining flanges 23 abutting on an outer cover of the wheel 2 laterally to the tread 19.

The ends of the clamping arms 17 and 18 which are located opposite the free ends 20 are secured to sliding sleeves 24 and 25. These sliding sleeves are supported such that they are adapted to be displaced along a crossbar 14 in directions 71. At the clamping position 9 of the clamping arms 17 and 18, the sliding sleeves are arranged in spaced relationship with ends 15 and 16 of said crossbar 14. On the side located opposite the clamping arms, the sliding sleeves 24 and 25 are connected to a piston-cylinder unit 26 in a motion-transmitting manner by means of connection arms 27 and 28. The respective ends of said connection arms 27 and 28 are pivotably supported on the sliding sleeve in question and on the piston-cylinder unit 26. A part of the piston-cylinder unit 26 is supported such that it is adapted to be displaced in the direction of movement 72, whereby the sliding sleeves 24 and 25 are adapted to be displaced in directions 71 along the crossbar 14 via the motion-transmitting connection by means of the connection arms 27 and 28.

The piston-cylinder unit 26 is secured to a bearing bush 74. This bearing bush 74 is arranged approximately centrally relative to the crossbar 14 and such that it extends concentrically with a horizontal axle 13. The reception means 3 is adapted to be pivoted about this horizontal axle 13 from its receiving position 7 to the cleaning position 8 which is shown by a broken line. The associated pivoting angle 70 is approx. 90°.

A wheel guide means 54 is formed between the insertion opening 48 and the reception means 3, said wheel guide means 54 being defined by two guide rollers 55 and 56 which are rotatably supported on a sidewall 29 of a cleaning chamber 4 surrounded by the housing 47 according to FIG. 1. The guide rollers 55 and 56 are arranged relative to one another in such a way that their axes of rotation 57 and 58 include an acute angle 59 and intersect approximately in the rotating axle 13 for the crossbar 14. In addition, the guide rollers 55 and 56 are arranged above as well as below a centre 69 of the wheel 2.

At the cleaning position 8 of the reception means 3, the clamping arms 17 and 18 of said reception means 3 extend downwards in the direction of a discharge ramp 46. This discharge ramp 46 has a downward slope in the direction of a discharge opening 51, the discharge end 50 of said discharge ramp 46 ending in spaced relationship with said discharge opening 51.

Figure 3:
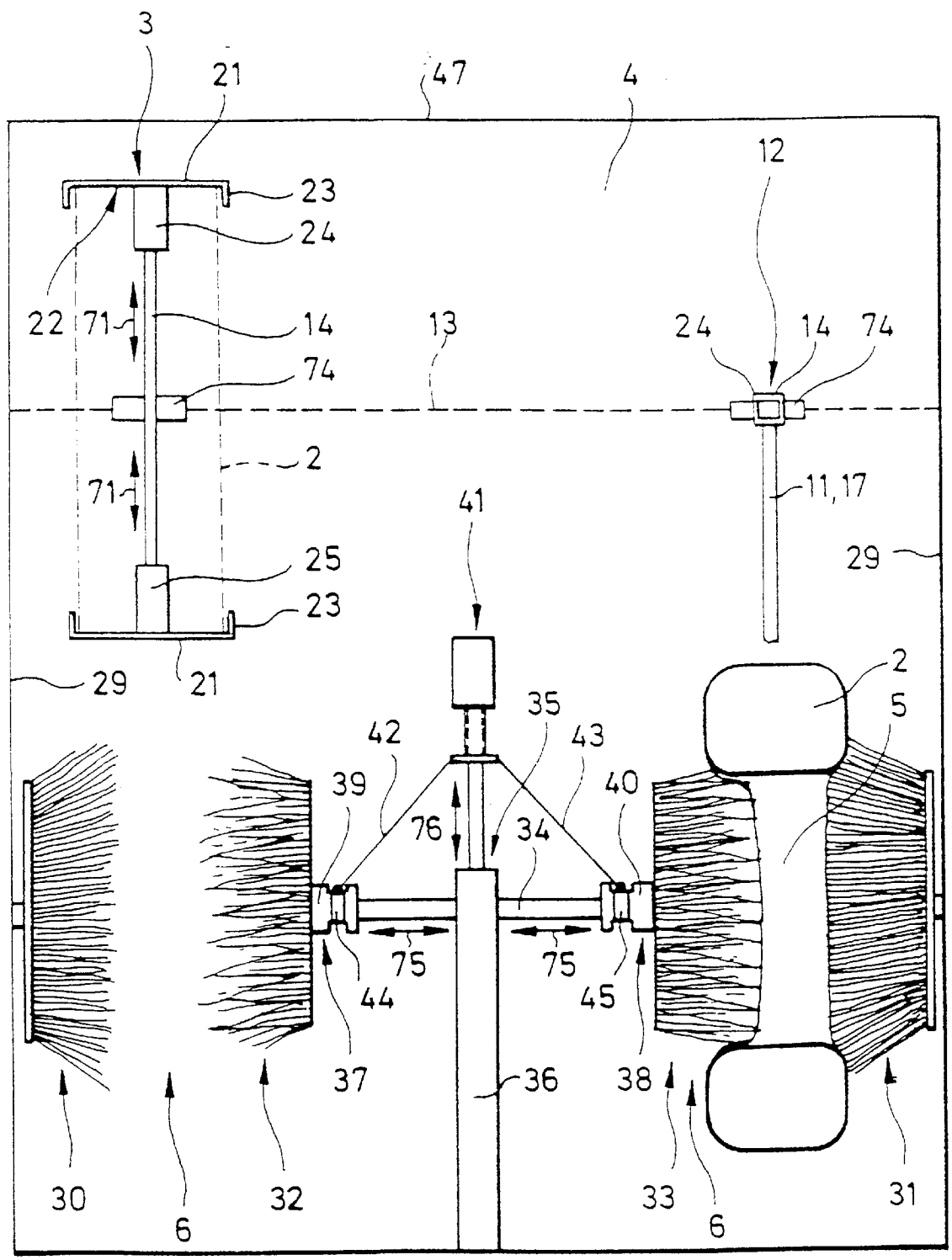
FIG. 3 shows a section along line III—III of FIG. 1.

At the cleaning position 8, the wheel rim 5 of the wheel 2 is associated with a washing device 6; a counterbrush 32 which constitutes part of said washing device 6 and which is rotatable about an rotating axle 34 can be seen in FIG. 3. This counterbrush 32 is rotatably supported on a brush carrier 36 which extends forwards and upwards at an angle in the direction of the insertion opening 48.

At the cleaning position 8 of the reception means 3, the clamping arms 17 and 18 are arranged at their clamping position 9 until the cleaning operation has been finished. Subsequently, the clamping arms can be moved by means of the piston-cylinder unit 26 to their release position 10, cf. the dot-and-dash line. For the sake of simplicity, the release position 10 is only shown for one clamping means 11 that corresponds to the clamping arm 18. At the release position 10, the clamping jaws 21 are arranged in spaced relationship with the tread 19 of the wheel 2 so that said wheel 2 will fall down onto the discharge ramp 46 and then roll along this ramp and leave the cleaning apparatus through the discharge opening 51. The means and actions described hereinbefore are analogous for a wheel inserted through the insertion opening 49 and a wheel leaving the cleaning apparatus through the discharge opening 52, cf. FIG. 1.

FIG. 3 shows a section along the line III—III of FIG. 1. In the interior of the housing 47, two reception means 3 and 12 are arranged side by side, said reception means 3 and 12 having, in principle, the same kind of structural design. Like reference numerals have been used to designate identical elements and only part of these reference numerals is mentioned again.

The reception means 3 is shown at its receiving position, cf. FIG. 2, whereas the reception means 12 is shown at its cleaning position 8, cf. again FIG. 2. Reference should be made to the fact that, normally, both reception means 3 and 12 are arranged at the same position so that two wheels are received and cleaned by the respective washing devices 6 synchronously. For this purpose, the reception means 3 and 12 are secured to the horizontal axle 13 through the respective bearing bushes 74, the axle 13 being rotatably supported on the sidewalls 29 of the cleaning chamber 4 or rather of the housing 47.

Below the reception means 3 and 12, also the associated washing devices 6 are arranged in pairs. Each of the washing devices comprises a stationary brush 30 and 31, respectively, which is rotatably supported on a sidewall 29, and a counterbrush 32 and 33, respectively, which is arranged opposite to the respective stationary brush and which is rotatably supported as well. Additional hot-water or steam nozzles, dosing means for cleaning liquids or drying means are not shown for the sake of simplicity.

The two counterbrushes 32 and 33 are supported on opposite ends 37 and 38 of a rotating axle 34. This rotating axle 34 is rotatably supported on an upper end 37 of the brush carrier 36. An adequate drive unit for the rotating axle 34 can, in principle, be arranged at an arbitrary point in the interior of or also outside of the housing 47, the driving connection to the rotating axle 34 being established through the interior of the brush carrier 36.

The respective ends 37 and 38 of the rotating axle 34 have attached thereto displacement caps 39 and 40. The counterbrushes 32 and 33 are releasably secured to said displacement caps. The ends of said displacement caps 39 and 40 which face each other include a circumferentially extending groove having supported therein a slip ring 44 and 45, respectively, which is arranged such that it is axially fixed and adapted to be rotated relative to the displacement caps. Each of said slip rings 44 to 45 has articulated thereon one end of a connection arm 42 and 43, respectively. The connections arms 42, 43 extend from the respective slip ring 44, 45 up to a piston-cylinder unit 41. This piston-cylinder unit 41 is arranged at the upper end 35 of the brush carrier 36.

By displacing e.g. the piston of the piston-cylinder unit 41 in directions 76 and by the motion-transmitting connection to the displacement caps 39 and 40 via the connection arms 42 and 43, said displacement caps are adapted to be displaced in directions 75 along the rotating axle 34.

When the reception means is at its receiving position, the respective counterbrush 32 is drawn back from the associated stationary brush 30 by means of the piston-cylinder unit 41. When the reception means is at its cleaning position, the counterbrush 33 is moved towards the stationary brush 31 by means of the piston-cylinder unit 41, whereby the wheel rim 5 can be cleaned by the brushes on both sides thereof.

Reference is again made to the fact that, due to the special structural design of the piston-cylinder units, both reception means 3 and 12 are pivoted synchronously and both counterbrushes 32 and 33 are moved towards or away from the respective stationary brush 30 and 31 associated therewith.

In the embodiment of the reception means 12 shown in FIG. 3, it can be seen that the crossbar 14 and the sliding sleeve 24, which is displaceably supported on said crossbar 14, have a square cross-section. This has the effect that the crossbar and the associated sliding sleeve are secured against rotation relative to one another in a simple manner.

Figure 4:
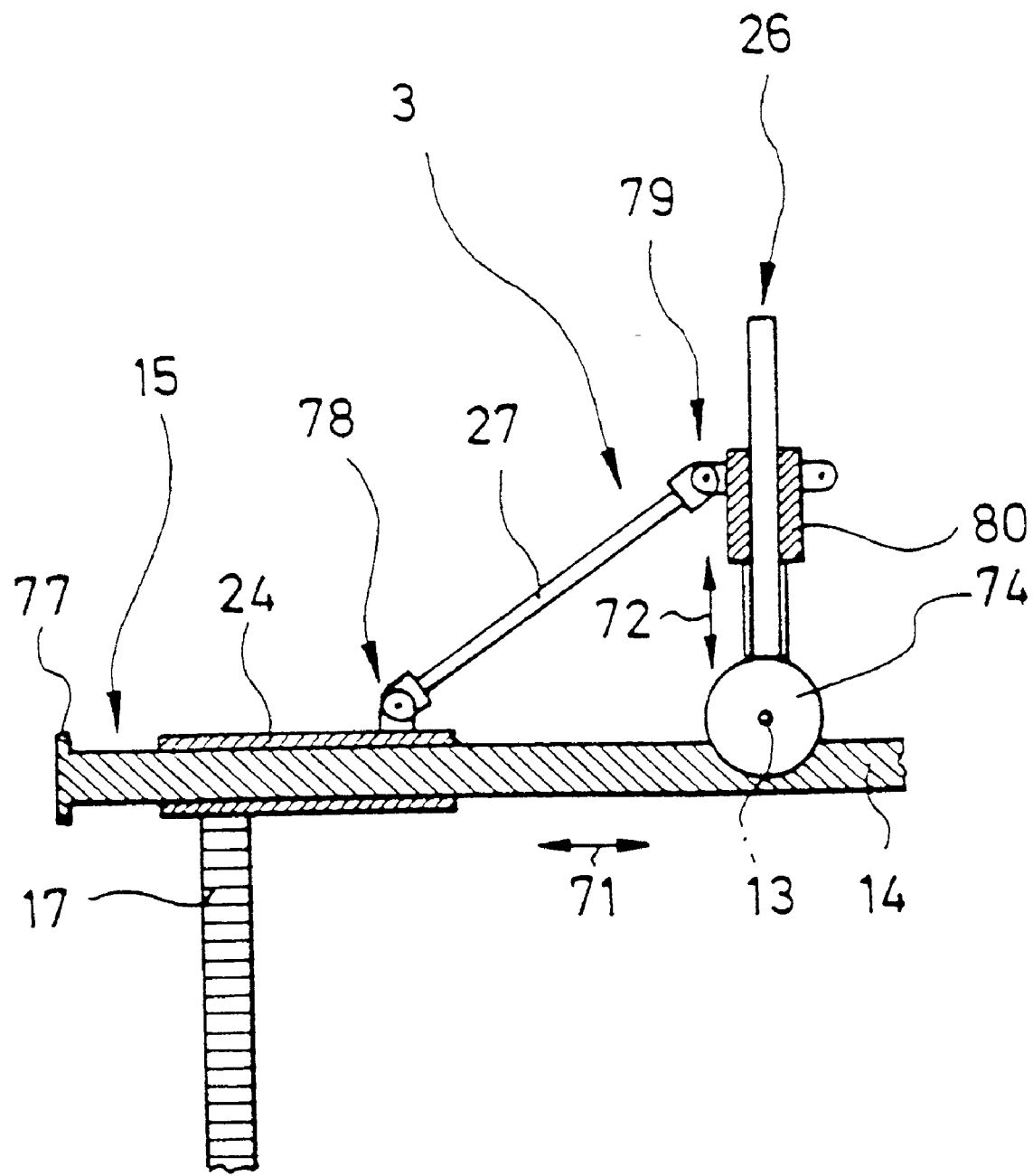
FIG. 4 shows an enlarged repesentation of a detail of a part of the reception means used in the cleaning apparatus.

FIG. 4 shows a detail of a part of the reception means 3. The reception means 12 has an analogous structural design. Like reference numerals have been used to designate identical elements and only part of these elements is mentioned again.

The sliding sleeve 24 is arranged in spaced relationship with a stop means 77 provided at the end 15 of the crossbar 14. On the upper side of said sliding sleeve, one of the ends 78 of the connection arm 27 is pivotably supported. The other end 79 of the connection arm 27 is pivotably supported on a piston 80 of the piston-cylinder unit 26. The piston-cylinder unit 26 projects upwards from the bearing bush 74 essentially at right angles thereto, said bearing bush 74 being arranged concentrically with the horizontal rotating axle 13 of the crossbar 14. On the lower surface of the sliding sleeve 24, the clamping arm 17 is secured to said sliding sleeve.

When the piston 80 moves in directions 72, the sliding sleeve 24 will move in directions 71 along the crossbar 14. The clamping position 9 of the clamping arms shown in FIG. 1 corresponds essentially to a position of the sliding sleeve 24 at which said sliding sleeve 24 abuts on the stop means 77 at the end of the crossbar 14.

I claim:

1. A cleaning apparatus (1) for wheels comprising at least one reception means (3) arranged in a cleaning chamber (4) and used for receiving a wheel, said cleaning chamber (4) having arranged therein at least one washing device (6) which is adapted to be associated especially with the rim (5) of a wheel, characterized in that the reception means (3) in the cleaning chamber (4) is supported such that it is pivotable between a receiving position (7) and a cleaning position (8) and that the reception means (3) comprises at least two clamping means (11) which are used for holding the wheel (2) and adapted to be displaced between a clamping position (9) and a release position (10), said clamping means (11) being arranged at their clamping position at least during the pivotal movement of the reception means from said receiving position to said cleaning position.

2. A cleaning apparatus according to claim 1, characterized in that two reception means (3, 12) are arranged side by side in said cleaning chamber (4).

3. A cleaning apparatus according to claim 2, characterized in that the reception means (3, 12) are supported on a substantially horizontal axle (13).

4. A cleaning apparatus according to claim 1, characterized in that the reception means (3, 12) are secured to said horizontal axle (13) and that said horizontal axle (13) is pivotably supported in the cleaning chamber (4).

5. A cleaning apparatus according to claim 1, characterized in that the reception means (3, 12) includes a crossbar (14) which extends essentially at right angles to said horizontal axle (13) and at the two ends (15, 16) of which the clamping means (11) are displaceably supported.

6. A cleaning apparatus according to claim 1, characterized in that the clamping means (11) are implemented as clamping arms (17, 18) which project from the crossbar (14) essentially at right angles thereto and which are in contact with substantially opposed sections of a tread (19) of the wheel (2) when they are at their clamping position.

7. A cleaning apparatus according to claim 1, characterized in that each clamping arm (17, 18) has at the free end (20) thereof a clamping jaw (21) which is adapted to be brought into engagement with the tread (19) of the wheel (2).

8. A cleaning apparatus according to claim 1, characterized in that the clamping jaw (21) has a concave contact surface (22).

9. A cleaning apparatus according to claim 1, characterized in that the clamping jaw (21) is provided with at least two retaining flanges (23) projecting on opposite sides of the contact surface (22).

10. A cleaning apparatus according to claim 1, characterized in that each clamping arm (17, 18) is secured to a sliding sleeve (24, 25) which is adapted to be displaced along the crossbar (14).

11. A cleaning apparatus according to claim 1, characterized in that the crossbar (14) has an angular cross-section.

12. A cleaning apparatus according to claim 1, characterized in that a piston-cylinder unit (26) is arranged approximately centrally relative to the crossbar (14) and is connected to the sliding sleeves (24, 25) in a motion-transmitting manner.

13. A cleaning apparatus according to claim 1, characterized in that the piston-cylinder unit (26) is arranged essentially at right angles to the crossbar (14) and connected to the sliding sleeves (24, 25) via connection arms (27, 28).

14. A cleaning apparatus according to claim 1, characterized in that the piston-cylinder units (26) of the reception means (3, 12) are adapted to be operated simultaneously.

15. A cleaning apparatus according to claim 1, characterized in that the washing device (6) is adapted to be associated with the rim (5) of a wheel (2) held by the reception means (3, 12) at the cleaning position (8).

16. A cleaning apparatus according to claim 1, characterized in that the washing device (6) includes at least one stationary brush (30, 31) which is rotatably supported on a sidewall (29) of the cleaning chamber (4).

17. A cleaning apparatus according to claim 1, characterized in that the washing device (6) includes a rotatably supported counterbrush (32, 33) which is located opposite said stationary brush (30, 31).

18. A cleaning apparatus according to claim 1, characterized in that the counterbrush (32, 33) is supported such that it is adapted to be displaced in the direction of its rotating axle (34).

19. A cleaning apparatus according to claim 1, characterized in that the rotating axle (34) is supported on the upper end (35) of a brush carrier (36) which is arranged substantially centrally between two reception means (3, 12).

20. A cleaning apparatus according to claim 1, characterized in that respective counterbrushes (32, 33) are displaceably arranged on both ends (37, 38) of said rotating axle (34).

21. A cleaning apparatus according to claim 1, characterized in that each counterbrush (32, 33) is arranged on a displacement cap (39, 40) which is connected to the rotating axle (34) in a motion-transmitting manner.

22. A cleaning apparatus according to claim 1, characterized in that, at the upper end (35) of the brush carrier (36), a piston-cylinder unit (41) is arranged which is connected to both displacement caps (39, 40) in a motion-transmitting manner.

23. A cleaning apparatus according to claim 1, characterized in that a connection arm (42, 43) is arranged between the piston-cylinder unit (41) and the respective displacement cap (39, 40).

24. A cleaning apparatus according to claim 1, characterized in that a connection arm end which is associated with the displacement cap (39, 40) is articulated on a slip ring (44, 45) which is rotatably supported on the displacement cap (39, 40) such that it is substantially non-displaceable in the axial direction.

25. A cleaning apparatus according to claim 1, characterized in that a discharge ramp (46) is arranged in the cleaning chamber (4) below the reception means (3, 12), when said reception means (3, 12) is located at its cleaning position.

26. A cleaning apparatus comprising a housing (47) surrounding the cleaning chamber (4) and provided with at least one insertion opening (48, 49) used for inserting a wheel (2) and associated with the reception means (3, 12), according to claim 1, characterized in that the housing (47) is provided with at least one discharge opening (51, 52) that is associated with the discharge end (50) of the discharge ramp (46).

27. A cleaning apparatus according to claim 1, characterized in that the insertion opening (48, 49) and the discharge opening (51, 52) are arranged in a front wall (53) of the housing (47) one on top of the other.

28. A cleaning apparatus according to claim 1, characterized in that a wheel guide means (54) is arranged on at least one side of said insertion opening (48, 49) and/or said discharge opening (51, 52) in the interior of the housing (47).

29. A cleaning apparatus according to claim 1, characterized in that said wheel guide means (54) is implemented as at least one guide roller (55, 56) which is rotatably supported on a sidewall of the housing (47).

30. A cleaning apparatus according to claim 1, characterized in that two guide rollers (55, 56) are rotatably supported on said sidewall, the axes of rotation (57, 58) of said guide rollers extending at an acute angle (59) and being directed essentially towards the rotating axle (13) of the reception means (3, 12).

\* \* \* \* \*